United States Patent Office 3,775,398
Patented Nov. 27, 1973

3,775,398
N-OXIDE OF DOUBLE STRANDED RNA
Michael Raymond Harnden, Horsham, England, assignor to Beecham Group Limited, Brentford, Middlesex, England
No Drawing. Filed Apr. 15, 1971, Ser. No. 134,393
Claims priority, application Great Britain, Apr. 23, 1970, 19,448/70
Int. Cl. C07d *51/50*
U.S. Cl. 260—211.5 R                2 Claims

ABSTRACT OF THE DISCLOSURE

N-oxides of natural double-stranded ribonucleic acids and salts thereof, which are themselves double-stranded, prepared by reacting double-stranded ribonucleic acids with hydrogen peroxide or a peracid, are described. The new RNA derivatives are interferon inducers and/or have antiviral activity and are less toxic than the parent RNA's. Natural RNA's have adenine, cytosine, uracil and guanine bases linked to repeating ribose/phosphate backbone units and different degrees of oxidation of the bases can be carried to produce a variety of new N-oxide derivatives. The conversion to single-stranded material is avoided by limiting the extent of oxidation and leaving some unoxidized base sites. Formulation into aerosols, injectibles and topicals is described.

---

The present invention relates to a novel class of interferon inducing compounds which are N-oxides of natural double-stranded ribonucleic acids, to a process for their preparation and to pharmaceutical compositions consisting of or comprising such materials.

Double-stranded ribonucleic acids (RNA's) from a wide variety of sources have been shown to have anti-viral activity in animals. Double-stranded RNA's can be extracted from virus particles present in certain infected fungi e.g. certain of the Penicillia, namely *P. chrysogenum, P. stoloniferum, P. funiculosum and P. cyaneofulvum*, and those RNA's have shown anti-viral activity.

Some other viruses from which anti-viral double-stranded RNA's can be extracted have been reported. These are Sugar Beat Yellow Virus, Rice Dwarf Virus, Reovirus 3, and at least one Cytoplasmic Polyhedrosis Insect Virus (although in this latter case the authors do not report the precise source of the cytoplasmic polyhedrosis viruses—Proc. Soc. Exp. Biol. and Med. 132. 2, 1969).

In addition to the above sources, double-stranded RNA's having anti-viral activity have been extracted from the replicative form of phage from MS2 from *E. coli*, the replicative form of phage from MU9 from *E. coli* and the replicative form of phage from *Pseudomonas aeruginosa*.

It has been confirmed in the majority of the above cases that the anti-viral action of double-stranded RNA's is due to the stimulation of interferon production in the animal cells. Thus it is not the double-stranded RNA itself which is the active anti-viral agent, but rather the interferon which is produced by the cells in response to the administration of the RNA. For this reason it is probably more accurate to refer to the double-stranded RNA's as "interferon inducers" rather than as "anti-viral agents."

It is recognised that double-stranded ribonucleic acids may be of value in the prophylaxis, and to a lesser extent, in the treatment of viral infections in animals and man. However, there is some evidence to suggest that the medicinal use of double-stranded RNA of natural origin may be limited, since double-stranded RNA in the form in which it is extracted from natural sources shows certain toxic side effects which appear to become more apparent with increasing dosages. This invention is based on the discovery that certain derivatives of double-stranded ribonucleic acid of natural origin are less toxic than the parent RNA's and yet retain good interferon inducing activity.

Accordingly the present invention provides N-oxides of natural double-stranded ribonucleic acids and salts thereof, said N-oxides and salts being themselves double-stranded.

The salts of the present invention may be ammonium salts or alkali metal salts (e.g. sodium or potassium), salts with organic bases such as amines and salts with polybasic organic materials such as polylysine and D.E.A.E. dextran. As used herein, the term "natural double-stranded ribonucleic acids" refers only to double-stranded ribonucleic acids derived from natural sources, e.g. those recited above, and does not include synthetic double-stranded ribonucleic acids such as Polyinosinic: Polycytidylic acid (Poly I: Poly C), Polyadenylic: Polyuridylic acid (Poly A: Poly U) or Polyguanylic: Polycytidilic acid (Poly G: Poly C). In addition, the term "double-stranded" refers to the characteristic whereby two separate ribonucleic acid molecules are associated by hydrogen bonding between some or all of the bases along each molecule. Such double-stranded ribonucleic acids are relatively inert to the action of ribonuclease, unlike the single-stranded variety.

The chemical identity of the N-oxides of the present invention will be readily understood by those familiar with the structure of ribonucleic acids. A ribonucleic acid is a polynucleotide. The molecule consists of repeating ribose/phosphate unit forming a backbone, with a pyrimidine or purine based attached to each ribose moiety. In the natural ribonucleic acids with which this specification is concerned, one of four different bases is attached to each sugar moiety, namely adenine, cytosine, uracil and guanine. The base radicals of the ribonucleic acid molecule are represented by the formulae:

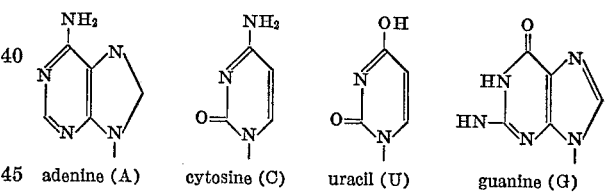

adenine (A)    cytosine (C)    uracil (U)    guanine (G)

In each of the above formulae, the free valency of the nitrogen atom is attached to a sugar moiety in the nucleic acid backbone. RNA's differ in the molecular weight and in the base sequence along the sugar/phosphate backbone.

In the double-stranded ribonucleic acids, two single-stranded RNA's are associated by hydrogen bonding between bases, an adenine base on the one being hydrogen bonded to a uracil base on the other, and a cytosine base on the one being hydrogen bonded to a guanine base on the other.

Theoretically the base radicals depicted above may each be converted to an N-oxide:

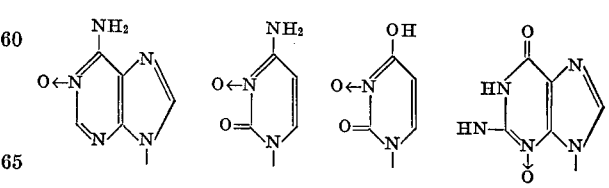

Thus, in theory, the double-stranded RNA N-oxides of the present invention may be broken down into five hypothetical groups:

(a) Those in which adenine is the only base oxidised
(b) Those in which cytosine is the only base oxidised (c) Those in which guanine is the only base oxidised
(d) Those in which uracil is the only base oxidised
(e) Those in which two or more of the four bases are oxidised.

However, in practice it is believed that the uracil bases are not oxidised to any great extent and, unless very mild, selective oxidising conditions are employed, the adenine, guanine and cytosine bases are all oxidised to a greater or lesser extent in the same molecule.

Additionally, it will be clear that for any given double-stranded ribonucleic acid, various degrees of oxidation are possible, ranging from N-oxides in which only a very small proportion of the total oxidisable-base sites are oxidised, to those wherein the majority of the oxidisable-base sites are oxidised. We have found that as the degree of oxidation increases, i.e. as more and more of the bases are oxidised, the double-stranded molecule becomes more and more likely to separate into single-stranded material. Since this invention relates only to those N-oxides which are themselves double-stranded, it follows that the N-oxides of this invention have at least some un-oxidised base sites along the length of the molecule.

We employ an empirical method of measuring the degree of oxidation of the double-stranded N-oxides of this invention. The ultra-violet spectrum of a natural double-stranded ribonucleic acid exhibits a strong absorption peak at 258 m$\mu$ and weak absorption at 230 m$\mu$. As more and more of the bases in the double-stranded molecule are oxidised, the absorption at 230 m$\mu$ increases while the absorption at 258 m$\mu$ decreases. Thus the ratio of absorption peak heights is a measure of the degree of N-oxidation of the double-stranded ribonucleic acid, i.e. the ratio:

$$\frac{\text{absorption at 230 m}\mu}{\text{absorption at 258 m}\mu} \text{ (increases as the degree of oxidation increases).}$$

$\left(\text{NB. said ratio will hereafter be written as } A\frac{230 \text{ m}\mu}{258 \text{ m}\mu}\right).$ Two other parameters which we employ to measure the degree of oxidation of the materials of this invention are the hyperchromicity of the material and its T$m$ value. These parameters are obtained by recording the U.V. absorption of the material at a particular frequency, while gradually raising the temperature of the material. The U.V. absorption of a double-stranded RNA or at 258 m$\mu$ is always less than the absorption at the same frequency of the same material in single-stranded form. Also, as the temperature of the double-stranded material is increased, the hydrogen bonding between strands becomes weaker and weaker until ultimately the strands separate. It therefore follows that the U.V. absorption value of a double-stranded material will decrease with increasing temperature. The difference between the two extremes of absorption expressed as a percentage of the absorption of the double-stranded material, is termed the "hyperchromicity" of that material.

As explained, when the U.V. absorption at 258 m$\mu$ of the N-oxides of this invention is plotted against temperature, it is found that the absorption is greater at high temperatures than at low temperatures. The increase in absorption is a gradual one and it is possible to locate the temperature at which the absorption is half way between the absorption of the double-stranded material and that of the single-stranded material. This temperature is designated the T$m$ of the N-oxide and is dependent on the degree of oxidation and we find that the T$m$ decreases with increasing degree of oxidation.

In addition, a specific N-oxide of this invention may be hydrolysed to degrade the material to its individual nucleotide components (both oxidised and unoxidised). The relative ratios of unoxidised bases and oxidised bases may then be calculated, thereby providing a direct characterisation of the N-oxides of this invention.

In summary of what has gone before, it can be said that the present invention provides a new class of derivatives of double-stranded RNA's, namely the N-oxides. This new class of N-oxides contains a large number of different N-oxides differing in the number of base sites which are oxidised, i.e. the degree of oxidation. We have found that two parameters, namely the ratio of U.V. absorption at 230 m$\mu$ to that at 258 m$\mu$, and the T$m$, can be used as a measure of the degree of oxidation, while the relative ratios of unoxidised and oxidised bases may be calculated directly.

Thus, although the present invention includes all these N-oxides of double-stranded RNA's and salts thereof which are themselves double-stranded, a specific sub-class of N-oxides of the present invention which show good antiviral activity against a wide range of viruses and which are less toxic than the parent RNA's are those characterised as double-stranded N-oxidised ribonucleic acids and salts thereof in which the uracil bases are substantially unoxidised, from 5 to 40% of the adenine bases are oxidised, from 5 to 60% of the cytosine bases are oxidised and from 5 to 70% of the guanine bases are oxidised. The double-stranded character of the N-oxides is lost at high degrees of oxidisation, but it is unfortunately not possible to set a universally applicable upper limit on the degree of oxidation, beyond which single-stranded material is obtained. Such an upper limit is dependent on many factors, notably the temperature and the identity of the starting RNA.

The present invention also includes a method for the preparation of the N-oxides of double-stranded RNA's of this invention and salts thereof, which method comprises the reaction of a double-stranded ribonucleic acid or a salt thereof with hydrogen peroxide or a peracid.

Suitable peracids include peracetic, perbenzoic monoperphthalic or m-chloroperbenzoic acid. Of these peracids we prefer to use m-chloroperbenzoic acid since the reaction proceeds smoothly and controllably with this material.

The reaction is usually carried out in a suitable solvent for the double-stranded RNA. Suitable solvents are usually slightly alkaline to facilitate the solution of the RNA, e.g. potassium acetate in water and ethanol pH about 8 is usually a suitable reaction medium. In this case the product is obtained in potassium salt form.

The temperature at which the reaction takes place is not critical to the present invention. We prefer to avoid very low temperatures, at which the reaction proceeds extremely slowly, and very high temperatures at which there is grave risk of destroying the double-stranded nature of the RNA. Generally we find room temperature (about 20–25° C.) to be convenient, although a temperature of from 5° C. to 50° C. would be suitable.

The reaction time will vary according to the degree of oxidation required and the temperature of the reaction mixture. When a reaction temperature of about 20° C. is employed and m-chloroperbenzoic acid is employed as the oxidizing agent, the degree of oxidation of the product gradually increases over a period of several hours. Under these conditions, at about 16 hours generally, single-stranded N-oxides are obtained although it will be appreciated that the precise time when single-stranded materials are obtained is widely variable with the other reaction parameters.

The N-oxides of the present invention may be recovered from the reaction medium by antisolvent precipitation. A suitable antisolvent for the N-oxides is ethanol. The precipitate itself is conveniently collected by centrifugation. Any of the common purification procedures for nucleic acids may be applied to the product of this invention, e.g. chromatography and electrophoresis.

It should perhaps be pointed out that there is some evidence to suggest that the RNA's obtained from some natural sources are in fact mixtures of two or more RNA's. When separated by polyacrylamide gel electrophoresis for example, some fungal RNA's separate into up to 5 bands. Thus it should be understood that the present invention includes the N-oxides of such RNA mixtures, and it is sometimes possible to separate the N-oxides themselves into two or more distinct bands by electrophoresis.

As has been indicated earlier, the double-stranded N-oxides of this invention are capable of inducing interferon production in animals and man and they are generally less toxic than the parent RNA's from which they are derived, as demonstrated by toxicity studies in animals such as mice and they retain good antiviral activity. Since interferon is essentially a non-specific anti-viral agent, it follows that the N-oxides of this invention are of value in the prophylaxis and treatment of a wide range of virus infections such as those due to Coxsackie virus, Semliki Forest virus, vaccinia virus, foot and mouth disease virus, versicolor stomatitis virus, rabies virus and influenza virus.

Hence in another of its embodiments, the present invention provides a pharmaceutical composition comprising one or more of the double-stranded N-oxides of double-stranded ribonucleic acids or non-toxic salts thereof in admixture with one or more pharmaceutically acceptable carriers.

The composition of this invention may be formulated in aerosol form e.g. for intranasal administration, in injectable form for intraperitoneal injection, or in a form suitable for topical application, although clearly the formulation employed will be adapted according to the nature of the infection. In general, the present compositions are most effective in the prophylaxis of viral infections, although they are also effective in the treatment of such infections.

Although the N-oxides and compositions of this invention are most useful as antiviral agents, they also have utility as immunosuppressants or adjuvants in enhancing the immune response.

The present invention will now be illustrated in some of its embodiments in the following examples:

EXAMPLE 1

*Penicillium chrysogenum* A.T.C.C. 10,002 was cultivated as follows:

*Sporulation agar*

TABLE I

|  | G./l. |
|---|---|
| Glycerol | 7.5 |
| Black treacle | 7.5 |
| Yeast extract | 5.0 |
| NaCl | 10.0 |
| $MgSO_4 \cdot 7H_2O$ | 0.005 |
| $KH_2PO$ | 0.006 |
| $Fe_2(SO_4)_3(NH_4)_2SO_4 \cdot 24H_2O$ | 0.0016 |
| $CuSO_4 \cdot 5H_2O$ | 0.0001 |
| $CaSO_4$ | 0.25 |
| Agar | 20.0 |

Medium made up with demineralized water and pH adjusted to 6.6. 40 ml. of medium are added to 8 oz. medicinal bottles which are plugged with cottonwool and sterilised for 15 minutes at 121° C.

The slopes are inoculated from the stock culture, which is in soil, and incubated at 26° C. until well sporulated.

Barley flask cultures

Cottonwool plugged Thompson bottles containing 150 g. of whole grain ley are sterilised for 2 hours at 121° C. The spores from one 8 oz. slope are suspended in 25 ml. of a solution containing gylcerol 3.0% by weight and asparagine 0.1%, and this is used to inoculate five barley flasks to each of which is added a further 50 ml. of the suspending medium. The flasks are incubated at 26° C., and shaken by hand each day, until well sporulated, usually by 3–4 days. The flasks may be stored for several months at 2–3° C.

Fermentation medium

TABLE II

|  | G./l. |
|---|---|
| Glycerol | 0.5 |
| Glucose | 0.5 |
| Tryptone | 0.25 |
| Bacteriological peptone | 0.25 |
| Yeast extract | 0.125 |
| Corn steep liquor | 1.25 |
| $K_2HPO_4$ | 0.1 |
| NaCl | 0.5 |
| Antifoam agent | 0.03 |
| pH adjusted to 7.0. | |

The agent used is 10% Pluronic L81 in soya bean oil. The medium is made up with tap water.

Vegetative seed 75 l. of fermentation medium are steam sterilised in a 100 l. stainless steel baffled fermenter. A suspension of spores obtained by adding 100 ml. sterile water containing 0.01% Tween 80, to a barley flask, and shaking, is used to inoculate the fermenter, which is incubated for 56 hours at 26° C. with seration and agitation.

Fermentation 1500 l. of fermentation medium are steam sterilised in a 2000 l. stainless steel, fully baffled fermenter. This is inoculated with 75 l. of vegetative seed and incubated at 26° C. for up to 5 days, with seration and agitation.

Whole fermentation broth (1500 l.) is clarified by centrifugation (model SARR 5036, Westfalia Separator Ltd.) and mycelium is discarded. To the chilled culture filtrate is added 300 g. commercial ribonucleic acid, sodium salt dissolved in 20 l. water then the mixture is acidified to pH 4.0 using 25% v./v. sulphuric acid and 0.5% w./v. diatomaceous earth filter aid (Dicalite 438, Berk Chemicals Ltd.) is added. After stirring for 30 minutes the mixture is filtered using a filter press. The solids retained in the press are washed with 100 l. pH 4.0 citrate buffer (1,205 g. trisodium citrate and 1,235 g. citric acid per litre) which is discarded. The washed solids are extracted with 2% w./v. sodium bicarbonate solution (150 l.) by recycling the solution for one hour through the filter press.

The extract so obtained is concentrated to 5 l. by membrane filtration (Millipore VS membrane, total area 3.5 sq. ft.) and the concentrate clarified by centrifuging for 1 hour at 23,000 g. Virus-like particles are sedimented at 186,000 g. (Beckman type 42 rotor), and purified by the following procedure.

Crude virus-like particle pellets are resuspended in buffer solution (0.01 M tris (hydroxymethyl) amino methane/0.15 M sodium chloride containing 10 μg./ml. penicillin G and 50 μg./ml. neomycin) and particulate impurities removed by centrifuging at 12,000 g. for 30 minutes. Further purification is effected by layering the suspension on 10% sucrose and immediately centrifuging at 186,000 g. for 90 minutes, the pellets being resuspended and centrifuged at 12,000 g. as above.

Double-stranded ribonucleic acid is then liberated from purified virus-like particles by treatment with detergent and phenol: sodium dodecyl sulphate is added to give 0.1% w./v. and the suspension extracted at 37° for 45 minutes with an equal volume of phenol saturated with buffer. Phases are separated by centrifugation at 500 g. and further phenol extractions carried out at room temperature until a clear interface is obtained in two successive extractions. When deproteinisation is complete, phenol is removed by extraction with ether and double-stranded RNA precipitated by the addition of two volumes absolute ethanol, having first made the solution 0.2 M with respect to sodium acetate. The mixture is stored at −20° C. to complete precipitation and the material may be left in this form until required or alternatively reconstituted in tris buffer and lyophilised.

Double-stranded RNA (20 mg.) obtained in this way was dissolved in 0.4 potassium acetate pH 8.2 (20 ml.) and a solution of m-chloroperbenzoic acid (500 mg.) in ethanol (10 ml.) added. The solution was allowed to remain at 20° C. for 1 hour and then ethanol (60 ml.) was added. The n-oxidised RNA precipitate obtained in this way was separated by centrifugation and washed with ethanol.

A sample of the N-oxidised RNA precipitate was dissolved in 0.4 M aqueous potassium acetate pH 8.2 and the ratio $$A\frac{230 \text{ m}\mu}{258 \text{ m}\mu}$$

was measured. The ratio $$A\frac{230 \text{ m}\mu}{258 \text{ m}\mu}$$

was then measured for the double-stranded RNA starting material and the two results compared:

$$A\frac{230 \text{ m}\mu}{258 \text{ m}\mu}$$

for double-stranded RNA starting material=0.45;

$$A\frac{230 \text{ m}\mu}{258 \text{ m}\mu}$$

for N-oxidised product=0.57.

A second sample of the N-oxidised product was then subjected to chromatographic separation on a Sepharose 2B column (gel filtration). This was carried out using a column 90 cm. long, internal diameter 2.5 cm., volume approx. 500 ml. The column was eluted in an upward direction with a solution containing sodium chloride (0.15 M), tris buffer (0.05 M) and magnesium chloride (0.005 M) pH 7.5 at a flow rate of 0.4 ml. per minute. Fractions containing 7.2 ml. were each collected and assayed for content of N-oxidised product estimated by the strength of U.V. absorption at 258 m$\mu$). It was found that the product was eluted from the Sepharose 2B column in the same fractions as were observed for the double-stranded RNA starting material—thus indicating that the N-oxidised product has the same molecular weight and overall shape as the starting material and was therefore completely double-stranded.

A third sample of the N-oxidised product was then subjected to polyacrylamide gel electrophoresis. This was carried out using 4% acrylamide gel and a buffer containing tris, 0.04 M; sodium acetate 0.02 M; sodium EDTA, 2n M; and acetic acid to bring the pH to 7.8. The run was carried out in a tube ¼ inch internal diameter and 4 inches long at 20° C. Current was applied up to 10 v./cm. at 5 ma./gel for 1–3 hours. The gel was removed and strained with a solution of methylene blue and the bands were observed. The procedure was repeated for the double-stranded RNA starting material and the results were compared. Differences were observed between the bands obtained in the two cases. The major band in the N-oxidised product only just moved onto the gel, whereas the starting material had a higher mobility and separated into 3 bands. This seems to indicate increased aggregation of the N-oxide as compared to the starting material.

A fourth sample of the N-oxidised product was examined in order to obtain its hyperchromicity and its T$m$ value. The measurements were carried out in 1 cm. cells using a Unicam SP800B spectrometer and a solution of the sample in 0.03 N aqueous sodium chloride containing 1% ethylene glycol. The solution temperature was elevated by ½° C. every minute and the U.V. absorption was plotted against temperature. It was found that the N-oxidised product had a T$m$ of 79° C. and a hyperchromicity of 34.6%.

The N-oxidised product afforded protection to mice when administered by the intraperitoneal route at concentrations of 10$\gamma$ and 100 per mouse challenged 24 hours later with encephalomyocarditis virus administered by the same route, the results being as follows:

TABLE I

| N-oxide. dose | Virus. dose | Mortality within 12 days in— | |
|---|---|---|---|
| | | Animals receiving N-oxide | Controls receiving no N-oxide |
| 10$\gamma$ | 10$^{-4}$ | 5/10 | 9/10 |
| 10$\gamma$ | 10$^{-5}$ | 0/10 | 8/10 |
| 100$\gamma$ | 10$^{-5}$ | 2/10 | 8/10 |

Protection was also afforded to mice against Semliki Forest virus and Coxsackie virus:

Activity of N-oxide against Semliki Forest virus (SFV) and Coxsackie virus (COX)

TABLE II

| N-oxide. dose | Virus. dose | Mortality within 12 days in— | |
|---|---|---|---|
| | | Animals receiving N-oxide | Controls receiving no N-oxide |
| 10$\gamma$ | SFV 10$^{-3}$ | 9/10 | 10/10 |
| 10$\gamma$ | SFV 10$^{-4}$ | 8/10 | 10/10 |
| 10$\gamma$ | SFV 10$^{-5}$ | 5/10 | 10/10 |
| 10$\gamma$ | COX 10$^{-1}$ | 6/10 | 10/10 |
| 10$\gamma$ | COX 10$^{-2}$ | 5/10 | 7/10 |
| 10$\gamma$ | COX 10$^{-3}$ | 2/10 | 4/10 |

The effect of the N-oxidised product on the immune response of mice was investigated as follows:

Mice were immunised by intravenous injection of a 10% suspension of sheep red blood cells. The compound to be tested was injected simultaneously by the same route.

The effect of the compound was assayed on the third day by means of the "localised haemolysis in gel technique." This procedure was a modified version of the "Jerne Plaque Assay" originally described by Jerne, Norden and Henry. ("Cell Bound Antibodies" Wistar Inst. Press, Philadelphia 1963, p. 109—Ed. Amos and Koprowski).

Mice were sacrificed and the spleens removed. Those were teased apart to release lymphoid cells. The spleens of 5 mice were pooled for each compound tested. After suitable dilution in culture medium 0.1 ml. suspension of spleen cells was mixed with liquid agar and sheep red blood cells and poured into a Petri dish to form a thin layer. After two hours incubation at 37° C. antibody had diffused into the surrounding agar from certain of the cells. Addition of complement (guinea pig serum) to lyse the sheep red blood cells in the areas where antibody is present. After further incubation to allow lysis of the red cells the plates were placed under a colony counter (magnifier with indirect light source) and the areas of lysis ("plaques") counted. These appear as clear areas against the opaque red background of unlysed red cells.

A cell count was performed on a sample of the cell suspension after plating. Results are expressed as plaque forming cells (PFC) per million spleen cells or per spleen.

Effect of the compound (the "immunological index") is expressed as the ratio of PFC/10$^6$ in the treated animals: those in the control (dosed with saline) group. Thus a ratio of 1.0 represents no effect. Below 1.0 represents immunosuppression and above is adjuvancy.

Results:
 Immunological index:
  at 10$\gamma$=1.07
  at 100$\gamma$=2.29

The N-oxidised product therefore exhibited an adjuvancy effect on the immune response.

The toxicity of the double-stranded RNA starting material and that of the N-oxidised product were compared using mice. The relevant experimental details are as follows:

Animals: Mice
Strain: Charles River, France S.P.F.
Sex: 0→
Condition: Non-starved
Wt. range: 20–25 gm.
Volume administered: 0.1 ml./10 gm. mouse
Diluent: Sterile water for injection (pyrogan-free)
No./dose level: 6

RESULTS

TABLE III

| Dosage, mg./kg. | Mortality in mice dosed with— | |
|---|---|---|
| | Starting material | N-oxidised product |
| 30 | 3/6—deaths occur 24–72 hrs. after dosage | 0/6 |
| 16 | 2/6—deaths occur 24–72 hrs. after dosage | 0/6 |
| 12–8 | do | 0/6 |
| 10.4 | do | 0/6 |
| 8 | do | 0/6 |

Toxic symptoms:
ds-RNA—lethargy, exudations around nose and eyes, ruffled coats, diarrhoea.
Modified RNA—"anaesthesia" for approx. 2 mins. after dosing.
Condition good throughout observation period.

These results clearly show that the N-oxidised product is less toxic in mice than the starting material.

EXAMPLE 2

Double-stranded RNA starting material obtained as in Example 1 was oxidised with m-chloroperbenzoic acid and using the same conditions as described in Example 1 with the exception that the reaction time was extended to 2.5 hr. The ratio $$A \frac{230 \text{ m}\mu}{258 \text{ m}\mu}$$

for starting material and product were measured as in Example 1.

$$A \frac{230 \text{ m}\mu}{258 \text{ m}\mu}$$

for starting material A=0.45;

$$A \frac{230 \text{ m}\mu}{258 \text{ m}\mu}$$

for N-oxidised product=0.61.

The product was fractionated on Sepharose 2B as in Example 1 and the major fraction eluted in the same fractions as had been observed for the da-RNA starting material.

Acrylamide gel electrophoresis using method of Example 1 gave similar results to those described for the product from Example 1.

The product had a T$m$ of 77.5°, hyperchromicity 34.6%, both parameters being measured as in Example 1.

It afforded protection to mice at 10γ and 100γ against Encephalomyocarditis virus, Semliki Forest virus and Coxsackle virus, the relevant results for Encephalomyocarditis virus being as follows:

TABLE IV

| Compounds, dose | Virus, dose | Mortality within 12 days in— | |
|---|---|---|---|
| | | Animals receiving compound | Controls receiving no compound |
| 10γ | 10⁻⁴ | 5/10 | 9/10 |
| 10γ | 10⁻⁵ | 1/40 | 8/10 |
| 100γ | 10⁻⁵ | 1/10 | 8/10 |

Activity of N-oxide against Semliki Forest virus (SFV) and Coxsackie virus (COX)

TABLE V

| N-oxide, dose | Virus, dose | Mortality within 12 days in— | |
|---|---|---|---|
| | | Animals receiving N-oxide | Controls receiving no N-oxide |
| 10γ | SFV 10⁻³ | 8/10 | 10/10 |
| 10γ | SFV 10⁻⁴ | 8/10 | 10/10 |
| 10γ | SFV 10⁻⁵ | 4/10 | 10/10 |
| 10γ | COX 10⁻¹ | 7/10 | 10/10 |
| 10γ | COX 10⁻² | 5/10 | 8/10 |
| 10γ | COX 10⁻³ | 2/10 | 5/10 |

Immunological index: 10γ, 0.63; 100γ, 1.26 (measured as in Example 1) Toxicity studies in mice as in Example 1 indicate a decreased toxicity as compared to unmodified ds-RNA. The results obtained were identical with those given in Example 1.

EXAMPLE 3

Double-stranded RNA starting material obtained as in Example 1 was oxidised with m-chloroperbenzoic acid using the same conditions as described above in Example 1, with the exception that the reaction time was extended to 5 hr. Again the various parameters were measured using the procedures of Example 1:

$$A \frac{230 \text{ m}\mu}{258 \text{ m}\mu}$$

for starting material=0.45;

$$A \frac{230 \text{ m}\mu}{258 \text{ m}\mu}$$

for N-oxidised product=0.67.

The product was fractionated on a Sepharose 2B and the major fraction eluted in the same fractions as had been observed for starting material.

Acrylamide gel electrophoresis gave similar results as described for the product from Example 1.

The product had a T$m$ of 75°, hyperchromicity 34.1%.

If afforded protection to mice at 10γ and 100γ against EMC Virus:

TABLE VI

| Compounds, dose | Virus, dose | Mortality within 12 days in— | |
|---|---|---|---|
| | | Animals receiving compound | Controls receiving no compound |
| 10γ | 10⁻⁴ | 2/10 | 10/10 |
| 100γ | 10⁻⁴ | 1/10 | 10/10 |

Immunological index: 10γ, 1.30; 100γ, 1.17.

EXAMPLE 4

Double-stranded RNA starting material obtained as in Example 1 was oxidised with m-chloroperbenzoic acid using the same conditions as described above in Example 1 with the exception that the reaction time was extended to 16 hr.

$$A \frac{230 \text{ m}\mu}{258 \text{ m}\mu}$$

for starting material=0.45;

$$A \frac{230 \text{ m}\mu}{258 \text{ m}\mu}$$

for N-oxidised product=2.22.

The product was fractionated on Sepharose 2B and the product eluted as a single fraction with an elution volume approximately 3× that observed for unmodified starting material.

The product was essentially single-stranded and had a hyperchromicity 10% with no definite T$m$.

If afforded only slight protection to mice at 10γ against EMC virus. Immunological index: 10γ, 1.10.

EXAMPLE 5

The N-oxides obtained in Examples 1, 2 and 3 (denoted INT 9, INT 10 and INT 14 respectively) were examined in order to determine the base ratios and degree of oxidation.

Base ratios were determined by hydrolysis of double stranded ribonucleic acid and its N-oxidation product INT, 9, 10 and 14 in 0.3 N NaOH at 37° for 18 hrs. The hydrolysate was neutralized with $NH_4Cl$ and the mixture of nucleoside 2',3' phosphates separated on a Dowex 1 x 8 column (200–400 mesh) eluted with increasing concentrations of hydrochloric acid. Cytidylic acids were eluted with 0.003 N, adenylic acids with 0.005 N, uridylic acids with 0.007 N and guanidylic acids with 0.1 N hydrochloric acid.

The fractions containing each nucleotide were combined and the nucleotide concentration calculated from its UV absorption. N-oxides of purines and pyrimidines are degraded by both aqueous alkali and acid ato product which do not absorb in the ultraviolet (J. Gangloff and J. B. Ebel, Bull. Soc. Chim. Biol. 1968, 50, 2335) and so cannot be determined directly.

| Compound | N-oxidation reaction time (hrs.) | Base ratios | | | | Percent base oxidised [1] | | | |
|---|---|---|---|---|---|---|---|---|---|
| | | A | U | C | G | A | U | C | G |
| ds-RNA (un-oxidised) | 0 | 0.97 | 1.04 | 0.98 | 1.00 | 0 | 0 | 0 | 0 |
| INT 9 | 1 | 0.80 | 1.00 | 0.74 | 0.72 | 20 | 0 | 26 | 28 |
| INT 10 | 2.5 | 0.75 | 1.00 | 0.70 | 0.72 | 25 | 0 | 30 | 28 |
| INT 14 | 5 | 0.70 | 1.00 | 0.45 | 0.36 | 30 | 0 | 55 | 64 |

[1] The total uridine 2',3' phosphate obtained by hydrolysis of a predetermined quantity of the N-oxidation products, in each case was identical with that obtained from the same amount of unmodified ds-RNA. This, coupled with the observation that under identical oxidation conditions polyribouridylic acid undergoes no significant degree of oxidation, permits the conclusion that the uracil residues of ds-RNA are not oxidised, and the percent oxidation figures quoted for the other bases are calculated on this premise.

EXAMPLE 6

Biological Data (A) Protection against Encephalomyocarditis virus (EMC): Intraperitoneal injections of 10 μg. and 100 μg. of the n-oxidised RAN's INT 9, 10, 14 and 6 (the products of Examples 1, 2, 3 and 4 respectively) were administered in 0.15 M NaCl to mice of the strain CD1 weighing 16–20 g. Twenty-four hours later these mice were challenged with varying dilutions of EMC also administered by the intraperitoneal route. The mortality ratios for the following 12 days for N–ovide treated animals and untreated controls were determined.

| Compound | Dose per mouse (μg.) | $LD_{50}$'s of virus administered | Mortality within 12 days in— | |
|---|---|---|---|---|
| | | | Animals receiving N-oxide | Control animals receiving no N-oxide |
| INT 9 (Example 1) | 10 | 10 | 0/10 | 16/20 |
| Do | 100 | 10 | 2/10 | 16/20 |
| Do | 10 | 20 | 6/10 | 9/9 |
| Do | 1 | 32 | 5/10 | 20/20 |
| Do | 2.5 | 32 | 4/10 | 20/20 |
| Do | 5 | 32 | 3/10 | 10/20 |
| Do | 10 | 32 | 3/10 | 20/20 |
| Do | 20 | 32 | 8/10 | 20/20 |
| Do | 40 | 32 | 6/10 | 20/20 |
| Do | 80 | 32 | 3/8 | 20/20 |
| Do | 10 | 100 | 5/10 | 9/10 |
| Do | 10 | 200 | 7/10 | 10/10 |
| Do | 10 | 2,000 | 10/10 | 10/10 |
| INT 10 (Example 2) | 10 | 1 | 1/10 | 5/10 |
| Do | 10 | 10 | 3/20 | 25/30 |
| Do | 100 | 10 | 1/10 | 25/30 |
| Do | 1 | 32 | 8/10 | 20/20 |
| Do | 2.5 | 32 | 5/10 | 20/20 |
| Do | 5 | 32 | 8/10 | 20/20 |
| Do | 10 | 32 | 9/10 | 20/20 |
| Do | 20 | 32 | 7/10 | 20/20 |
| Do | 40 | 32 | 3/10 | 20/20 |
| Do | 80 | 32 | 5/10 | 20/20 |
| Do | 10 | 100 | 14/20 | 19/20 |
| Do | 10 | 1,000 | 10/10 | 10/10 |
| INT 14 (Example 3) | 10 | 10 | 2/10 | 19 20 |
| Do | 100 | 10 | 1/10 | 19/20 |
| NT 6 (Example 4) | 10 | 10 | 5/10 | 16/20 |

(B) Effect of time of Administration of Drug upon Protection against EMC: Both RNA N-oxide (10 μg per mouse) and EMC challenge (10 $LD_{50}$'s) were administered intraperioneally as before, but the time of administration of the drug with respect to that of the virus challenge was varied.

| Compound | Time of administration with respect to time of virus challenge | Mortality within 12 days |
|---|---|---|
| INT 9 (Example 1) | 3 days before | 6/10 |
| Do | 1 day before | 3/10 |
| Do | 2 hrs. before | 1/10 |
| Do | 1 day after | 8/10 |
| INT 10 (Example 2) | 3 days before | 6/10 |
| Do | 1 day before | 3/10 |
| Do | 2 hrs. before | 1/10 |
| Do | 1 day after | 9/10 |

19/20 control animals receiving the same virus challenge but no drug, died within 12 days.

(C) Protection against Cocksackie B1 (Cox) and Semliki Forest (SFV) viruses: Intraperitoneal injections of 10 μg. of INT 9 (Example 1) were administered in 0.15 M NaCl to mice of the strain CD1 weighing 16–20 g. Twenty-four hours later the mice were challenged with varying dilutions of Cox or SFV also administered by the intraperitoneal route. The mortality ratios for the following 12 days for treated animals and untreated controls were determined.

| Virus | $LD_{50}$'s of virus administered | Mortality within 12 days in— | |
|---|---|---|---|
| | | Animals receiving N-oxide | Control animals receiving no N-oxide |
| SFV | 50 | 5/10 | 11 11 |
| | 500 | 8/10 | 10/10 |
| | 5,000 | 9/10 | 10/10 |
| | 50,000 | 10/10 | 10/10 |
| COX | 0.4 | 2/10 | 4/10 |
| | 4 | 5/10 | 7/10 |
| | 40 | 6/10 | 10/10 |

(D) Mouse Toxicity Studies, Intravenous Route: The toxicity of the double stranded RNA starting material and that of the N-oxidised product INT 9 (Example 1) and INT 10 (Example 2) were compared in female mice of the Charles River France S.P.F. strain weighing 20–25 g. The nucleic acids were administered intravenously in 0.2 ml. pyrogen free sterile water.

| Dose level | Unmodified ds-RNA mortality | INT 9 (Example 1) mortality | INT 10 (Example 2) mortality |
|---|---|---|---|
| 8 | 0/6 | 0/6 | 0/6 |
| 10 | 0/6 | 0/6 | 0/6 |
| 12.8 | 0/6 | 0/6 | 0/6 |
| 16 | [1] 2/6 | 0/6 | 0/6 |
| 30 | [1] 3/6 | 0/6 | 0/6 |

[1] Occur 24–72 hr.

Intraperitoneal Route: The toxicity of the double stranded RNA starting material and that of the N-oxidised product INT 9 (Example 1) were compared in mice of the strain CD1 weighing 16–20 g. The nucleic acids were administered intraperitoneally in 0.15 M NaCl.

| | Unmodified ds-RNA mortality within 10 days | INT 9 (Example 1) mortality within 10 days |
|---|---|---|
| Dose level (mg./kg.): | | |
| 10 | 0/8 | ND |
| 20 | 0/8 | 0/2 |
| 40 | 6/8 | 0/2 |
| 60 | 5/8 | ND |
| 70 | ND | 0/2 |
| 80 | 8/8 | ND |
| 110 | 8/8 | ND |
| 120 | ND | 0/3 |
| 125 | 8/8 | ND |
| 150 | 7/8 | 0/2 |
| 200 | ND | 1/2 |

What is claimed is:

1. An N-oxide of a naturally double-stranded ribonucleic acid or pharmaceutically acceptable non-toxic salt thereof, said N-oxide or salt being itself double stranded.

2. An N-oxide or salt thereof as claimed in claim 1 wherein the uracil bases of the double-stranded ribonucleic acid or salt are substantially unoxidised, from 5 to 40% of the adenine bases thereof are oxidised, from 5 to 60% of the cystosine bases thereof are oxidised and from 5 to 70% of the guanine bases thereof are oxidised.

References Cited

UNITED STATES PATENTS 3,317,511   5/1967   Kawashima et al. __ 260—211.5 R

OTHER REFERENCES

"Chem. Abst.," vol. 68, 1968, p. 3340S.

LEWIS GOTTS, Primary Examiner
JOHNNIE R. BROWN, Assistant Examiner

U.S. Cl. X.R.

424—85